(12) United States Patent
Wen

(10) Patent No.: US 12,464,617 B2
(45) Date of Patent: Nov. 4, 2025

(54) METHOD OF SELECTING PWM DIMMING FREQUENCY FOR DIMMABLE LED POWER SUPPLY

(71) Applicant: Zhuhai Shengchang Electronics Co., Ltd., Zhuhai (CN)

(72) Inventor: Guobiao Wen, Meizhou (CN)

(73) Assignee: Zhuhai Shengchang Electronics Co., Ltd., Zhuhai (CN)

( * ) Notice: Subject to any disclaimer, the term of this patent is extended or adjusted under 35 U.S.C. 154(b) by 121 days.

(21) Appl. No.: 18/515,833

(22) Filed: Nov. 21, 2023

(65) Prior Publication Data

US 2024/0206032 A1    Jun. 20, 2024

(30) Foreign Application Priority Data

Dec. 16, 2022  (CN) .......................... 202211626532.7

(51) Int. Cl.
*H05B 45/325* (2020.01)
*H05B 45/10* (2020.01)

(52) U.S. Cl.
CPC ........... *H05B 45/325* (2020.01); *H05B 45/10* (2020.01)

(58) Field of Classification Search
CPC ...... H05B 45/325; H05B 45/10; H05B 45/30; H05B 45/335
See application file for complete search history.

(56) References Cited

U.S. PATENT DOCUMENTS

| | | | |
|---|---|---|---|
| 2022/0154104 A1* | 5/2022 | Okuno | C11D 3/30 |
| 2022/0302824 A1* | 9/2022 | Araumi | H02M 3/158 |
| 2022/0394835 A1* | 12/2022 | Yokum | H05B 45/31 |

* cited by examiner

*Primary Examiner* — Minh Tran
(74) *Attorney, Agent, or Firm* — Wang Law Firm, Inc.

(57) ABSTRACT

The present invention discloses a method of selecting a PWM dimming frequency for a dimmable LED power supply. After a main power drive is powered on, a main control module checks a shift element signal status of a four-shift switching module. Based on the main control module, a dimming PWM pulse frequency currently outputted by the power supply is determined according to the shift element signal status, a sample signal of a dimming signal processing circuit is collected to obtain a sample signal, a PWM drive signal is determined according to the dimming PWM pulse frequency and sample signal, and a switch status of a power MOS tube is controlled according to the PWM drive signal to adjust a lamp brightness. The invention allows user to freely select or set the dimming PWM pulse frequency of the dimmable power supply according to the environmental conditions of the use.

3 Claims, 4 Drawing Sheets

100

When the main power drive is powered on for the first time, the main control module sets the dimming PWM pulse frequency to a default frequency, collects a signal sample of the dimming signal processing circuit to obtain a sample signal, determines a PWM drive signal according to the dimming PWM pulse frequency and the sample signal, and controls a switch status of the power MOS tube according to the PWM drive signal to adjust a lamp brightness.

200

A key matrix module and a display module are used to adjust the dimming PWM pulse frequency.

FIG.4

METHOD OF SELECTING PWM DIMMING FREQUENCY FOR DIMMABLE LED POWER SUPPLY

FIELD OF INVENTION

The present invention is related to the field of lamp devices, and more particularly related to a method of selecting a PWM dimming frequency for a dimmable LED power supply.

BACKGROUND OF THE INVENTION

In the field of dimmable power supply, Pulse Width Modulation (PWM) dimming control technology is currently the most ideal LED dimming method as well as the mainstream dimming control method. This technology is popular, due to its advantages of high dimming accuracy, broad range of dimming grayscale, no color shift during dimming, etc. The principle of PWM dimming is to realize the dimming by means of the persistence of vision in humans. The power output with a frequency higher than the frequency of the persistence of vision in humans is used for high frequency switching, and the purpose of dimming an LED lamp can be achieved by controlling the ratio of the positive duty cycle (ON time) to the negative duty cycle (OFF time) of the PWM. High-quality PWM dimming requires relatively stricter conditions for programs and hardware. At a lower PWM pulse frequency, the dimming grayscale range is broad, and the dimming effect is smooth, thus enabling the LED to have extremely low brightness. However, there will be a flicker phenomenon if the PWM pulse frequency is too low, and staying in such environment will cause fatigue to human eyes. In occasions that require a relatively high camera shooting effect, it is necessary to adjust the PWM pulse frequency. The higher the PWM pulse frequency, the lower the flicker effect of the camera shooting. However, high-pitched noises will be produced during dimming, and the dimming grayscale rang will be reduced after the PWM pulse frequency is increased. As a result, the lamp brightness cannot be adjusted to very low brightness while ensuring a good dimming effect.

For the deficiencies of the related art with the foregoing phenomenon, it is a technical issue for those skilled in the art to overcome the issue and provide a method that enables users to freely select or set the dimming PWM pulse frequency of an LED dimmable power supply according to the environmental conditions of the use.

SUMMARY OF THE INVENTION

In order to overcome the deficiencies of the related art, it is a primary objective of the present invention to provide a method of selecting a PWM dimming frequency for a dimmable LED power supply.

To achieve the above objective, the present invention provides the following solution:

A method of selecting a PWM dimming frequency for a dimmable LED power supply is applied to an LED dimmable power supply, and the LED dimmable power supply includes a power MOS tube and a main power drive, a dimming signal processing circuit, a main control module and four-shift switching module, which are sequentially connected to one another. The power MOS tube has a gate connected to the main control module, a source connected to the main power drive a drain connected to the negative electrode of a lamp, and the main power drive is connected to a positive electrode of the lamp. The method includes the steps of:

detecting a shift element signal status of a four-shift switching module by the main control module, after the main power drive is powered on;

determining the dimming PWM pulse frequency currently outputted by the power supply according to the shift element signal status based on the main control module, and collecting a signal sample of the dimming signal processing circuit to obtain a sample signal; and determining the PWM drive signal according to the dimming PWM pulse frequency and the sample signal based on the main control module, and controlling the switch status of the power MOS tube according to the PWM drive signal to adjust a lamp brightness.

Preferably, the shift elements of the four-shift switching module comprise 1 KHz frequency, 4 KHz frequency, 20 KHz frequency and 20 KHz frequency combined with a PWM pulse frequency conversion.

Preferably, the method further includes the steps of:

setting the PWM pulse frequency of the shift elements of the four-shift switching module by modifying a software program.

A method of selecting a PWM dimming frequency for a dimmable LED power supply is applied to an LED dimmable power supply, and the LED dimmable power supply includes a power MOS tube, a display module, and a main power drive, a dimming signal processing circuit, a main control module and a key matrix module which are sequentially connected to one another, and the power MOS tube has a gate connected to the main control module, a source connected to the main power drive, and a drain connected to a negative electrode of a lamp, and the main power drive is connected to a positive electrode of the lamp, and the main control module is connected to the display module. The method includes the steps of:

setting a dimming PWM pulse frequency to a default frequency by the main control module when the main power drive is powered on for the first time, and collecting a signal sample of the dimming signal processing circuit to obtain a sample signal, determining a PWM drive signal according to the dimming PWM pulse frequency and the sample signal, and controlling a switch status of the power MOS tube according to the PWM drive signal to adjust a lamp brightness; and adjusting the dimming PWM pulse frequency by a key matrix module and a display module based on the main control module.

Preferably, the step of adjusting the dimming PWM pulse frequency by the key matrix module and the display module further includes the steps of:

constructing a human-machine interactive operation interface by the key matrix module and the display module;

checking the current dimming PWM pulse frequency by the human-machine interactive operation interface;

set the numerical value of the dimming PWM pulse frequency by the human-machine interactive operation interface.

Preferably, the step of adjusting the dimming PWM pulse frequency by the key matrix module and the display module further includes the step of:

Selecting a default shift element frequency as the numerical value of the current dimming PWM pulse frequency by the human-machine interactive operation interface, wherein there is at least one default shift element frequency.

According to the embodiments of the present invention, the present invention has disclosed the following technical effects:

In the first aspect of the present invention, after the main power drive is powered on, the main control module is used to detect the shift element signal status of the four-shift switching module, determine the dimming PWM pulse frequency currently outputted by the power supply according to the shift element signal status based on the main control module, and collect the signal sample of the dimming signal processing circuit to obtain the sample signal; determine the PWM drive signal according to the dimming PWM pulse frequency and the sample signal based on the main control module, and control the switch status of the power MOS tube according to the PWM drive signal to adjust the lamp brightness. In a second aspect of the present invention, when the main power drive is powered on for the first time, the main control module sets the dimming PWM pulse frequency as the default frequency, collects the signal sample of the dimming signal processing circuit to obtain the sample signal, determines the PWM drive signal according to the dimming PWM pulse frequency and the sample signal, and controls the switch status of the power MOS tube according to the PWM drive signal to adjust the lamp brightness. Based on the main control module, the dimming PWM pulse frequency is adjusted by the key matrix module and the display module. The present invention allow users to freely select or set the dimming PWM pulse frequency of the LED dimmable power supply according to the environmental conditions of the use.

BRIEF DESCRIPTION OF THE DRAWINGS

In order to more clearly illustrate the embodiments of the present invention or the technical solutions of the prior art, the following drawings illustrating the implementation of the embodiments are used as a brief introduction. It is obvious that the following description of the drawings are only some of the embodiments of the present invention. As to the persons having ordinary skill in the art, other drawings can also be obtained from without requiring creative effort or labor.

FIG. 4 is a flow chart of a method in accordance with the second embodiment of the present invention.

BRIEF DESCRIPTION OF NUMERALS USED IN THE DRAWINGS

1—Main power drive, 2—Dimming signal processing circuit, 3—Main control module, 4—Power MOS tube, 5—Key matrix module, 6—Display module.

DETAILED DESCRIPTION OF THE PREFERRED EMBODIMENTS

The technical solutions in the embodiments of the present invention will be clearly and comprehensively described in conjunction with the accompanying drawings in the embodiments of the present invention as follows. Obviously, the described embodiments are only part of the embodiments of the present invention, but not all embodiments. Based on the embodiments in the invention, all other embodiments obtained by those having ordinary skill in the art without making creative efforts shall fall within the scope of protection of the invention.

The term "embodiment" mentioned in this specification herein means that a particular feature, structure, or characteristic described together with an embodiment may be included in at least one embodiment of the present application. The presence of the term "embodiment" at various positions in the specification does not necessarily refer to the same embodiment, nor is it a separate or alternative embodiment that is mutually exclusive of other embodiments. It is understood by those skilled in the art, both explicitly and implicitly, that the embodiments described herein may be combined with other embodiments.

The terms "first", "second", "third", "fourth", etc. in the specification, claims and accompanying drawings of the present application are used to distinguish between different objects and are not intended to describe a particular order. In addition, the terms "comprises" and "has", and any of their variations are intended to cover non-exclusive inclusion. For example, the inclusion of a series of steps, processes, methods, etc. is not limited to the listed steps, but optionally includes steps that are not listed, or optionally includes other steps that are inherent to those processes, methods, products or equipment.

It is an objective of the present invention to provide a method of selecting a PWM dimming frequency for a dimmable LED power supply, and allow users to freely select or set the dimming PWM pulse frequency of an LED dimmable power supply according to the environmental conditions of the use.

The objective, characteristics and advantages of the present invention will become apparent in the following detailed description of the preferred embodiments with reference to the accompanying drawings.

First Embodiment

Figure 1:
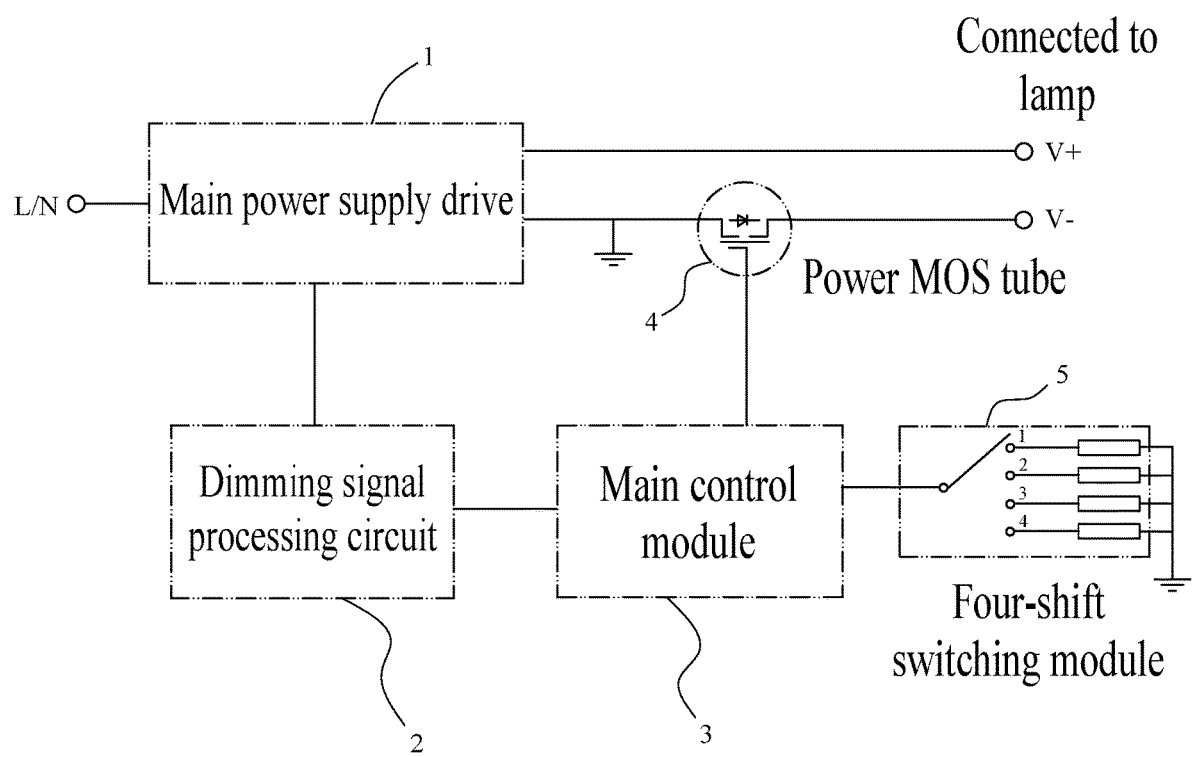
FIG. 1 is a schematic circuit block diagram of a first embodiment of the present invention.

With reference to FIG. 1 for the schematic circuit block diagram of the first embodiment of the present invention, a main power drive 1 is connected to a utility power L, an input N, a dimming signal processing circuit 2, an output V+, and a S electrode of a power MOS tube 4; the main control module 3 is connected to a dimming signal processing circuit 2, a G electrode of the power MOS tube 4, a four-shift switching module 5; a D electrode of the power MOS tube 4 is connected to an output terminal V−.

Figure 2:
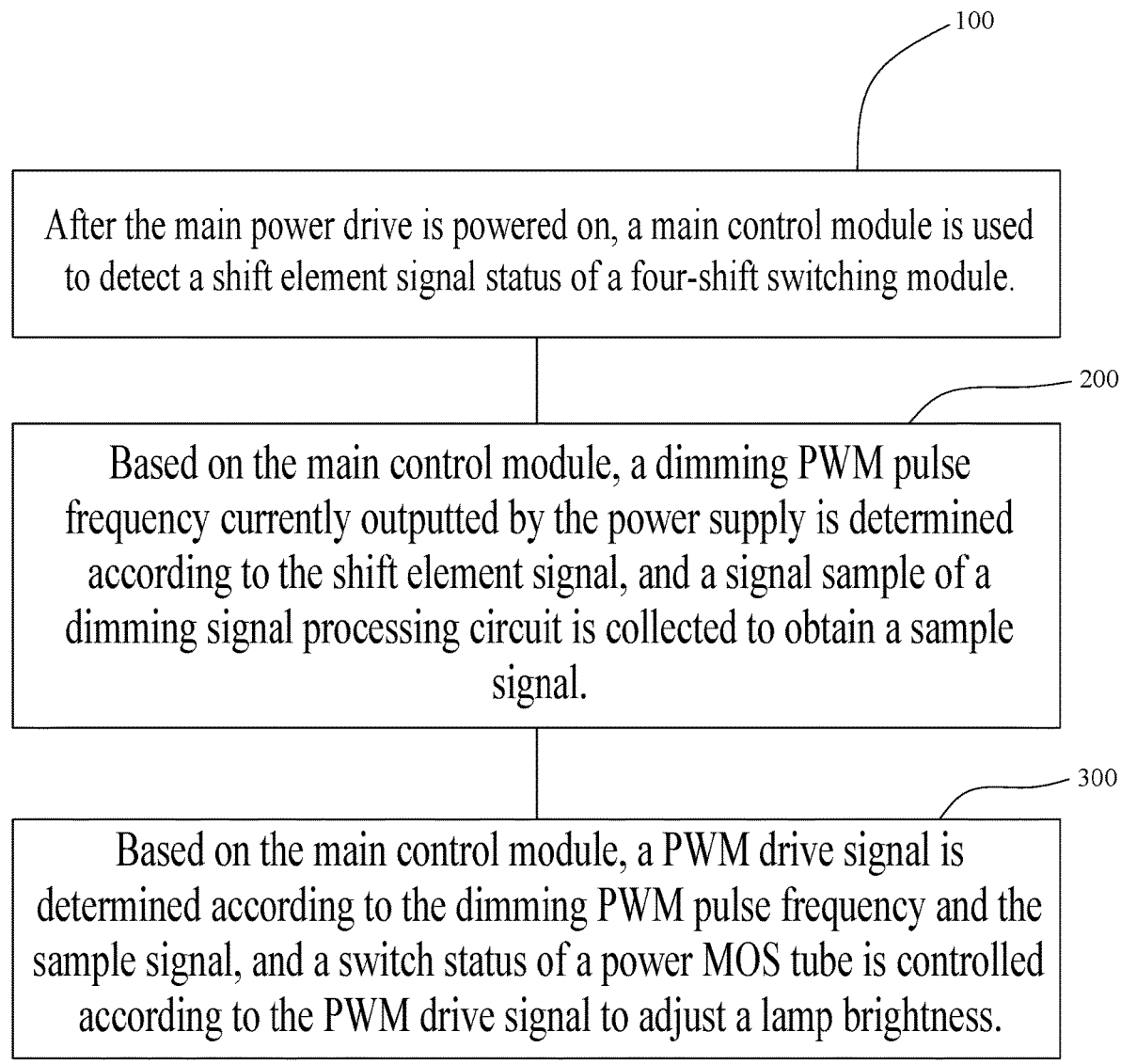
FIG. 2 is a flow chart of a method in accordance with the first embodiment of the present invention.

With reference to FIG. 2 for the flow chart of a method in accordance with the first embodiment of the present invention, this embodiment provides a method of selecting a PWM dimming frequency for a dimmable LED power supply, including the following steps S100~S300:

S100: After the main power drive is powered on, a main control module is used to detect a shift element signal status of a four-shift switching module.

S200: Based on the main control module, a dimming PWM pulse frequency currently outputted by the power supply is determined according to the shift element signal, and a signal sample of a dimming signal processing circuit is collected to obtain a sample signal.

S300: Based on the main control module, a PWM drive signal is determined according to the dimming PWM pulse frequency and the sample signal, and a switch status of a power MOS tube is controlled according to the PWM drive signal to adjust a lamp brightness.

Specifically, after the main power drive 1 is powered on, the main control module 3 gives a first priority to detect the shift element signal status of a four-shift switching module 5 and determine the magnitude of the dimming PWM pulse frequency currently outputted by the current power according to the shift element signal status. The dimming brightness of the load lamp is controlled jointly by the main control module 3 and the power MOS tube 4. In other words, the main control module 3 collects samples to analyze the signal size of the dimming signal processing circuit 2, and then outputs the corresponding PWM drive signal to the power MOS tube 4, so the lamp brightness varies from 0% to 100%.

Further, the PWM pulse frequency of the four shift elements of the four-shift switching module 5 may be set to Shift 1: 1 KHz frequency; Shift 2: 4 KHz frequency; Shift 3: 20 KHz frequency; and Shift 4: 20 KHz frequency, combined with the PWM pulse frequency conversion.

Further, the magnitudes of the PWM pulse frequency of the four shift elements of the four-shift switching module 5 can be freely adjusted by a software program as needed.

Second Embodiment

Figure 3:
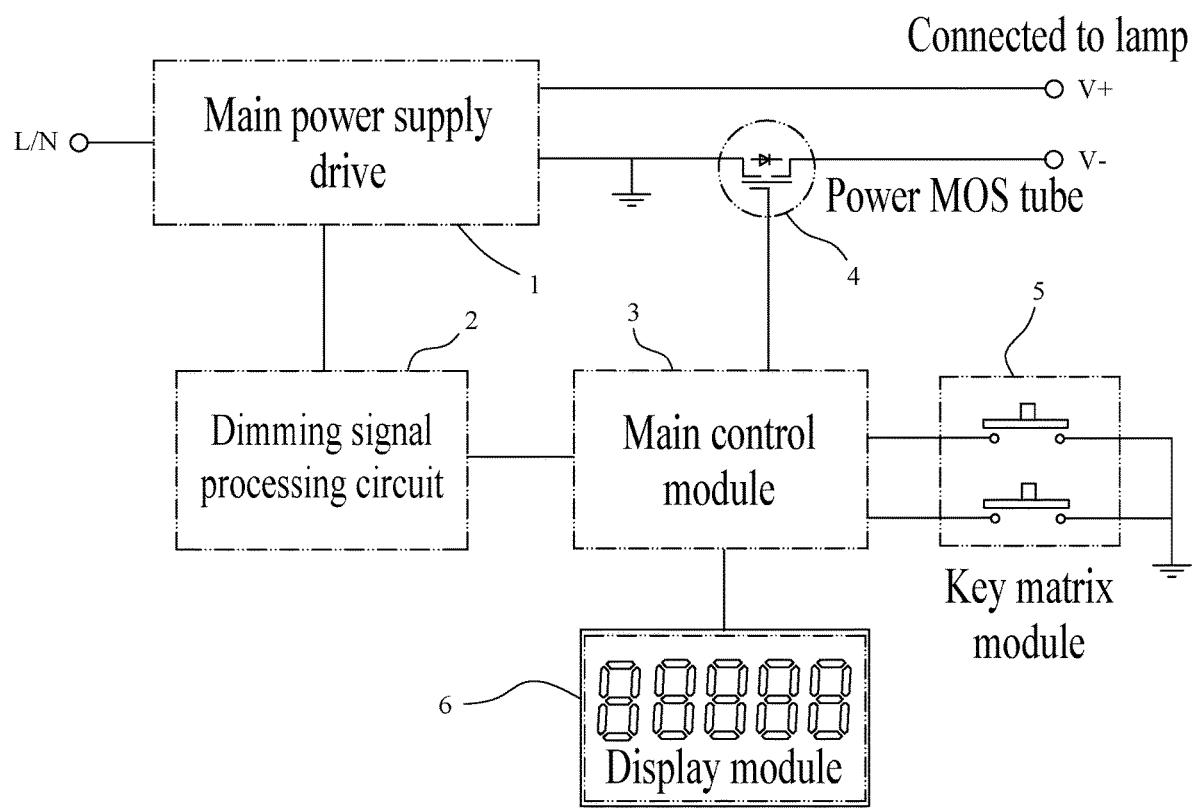
FIG. 3 is a schematic circuit block diagram of a second embodiment of the present invention.

With reference to FIG. 3 for the schematic circuit block diagram of the second embodiment of the present invention, a main power drive 1 is connected to a utility power L, an input N, a dimming signal processing circuit 2, an output V+, a S electrode of a power MOS tube 4; the main control module 3 is connected to a dimming signal processing circuit 2, a G electrode of the power MOS tube 4, a key matrix module 5, a display module 6; and a D electrode of the power MOS tube 4 is connected to an output terminal V−.

With reference to FIG. 4 for a method in accordance with the second embodiment of the present invention, this embodiment provides a method of selecting a PWM dimming frequency for a dimmable LED power supply, including the following steps S100~S200:

S100: When the main power drive is powered on for the first time, the main control module sets the dimming PWM pulse frequency to a default frequency, collects a signal sample of the dimming signal processing circuit to obtain a sample signal, determines a PWM drive signal according to the dimming PWM pulse frequency and the sample signal, and controls a switch status of the power MOS tube according to the PWM drive signal to adjust a lamp brightness.

S200: A key matrix module and a display module are used to adjust the dimming PWM pulse frequency.

Specifically, when the main power drive 1 is powered on for the first time, the main control module 3 will set the dimming PWM pulse frequency as a default 4 KHz frequency, and the key matrix module 5 and the display module 6 can be used as a human-machine interactive operation interface.

Further, the current dimming PWM pulse frequency of the power supply drive can be checked through the human-machine interactive operation interface, in order to set the dimming PWM pulse frequency to an arbitrary value.

Further, several factory default settings of the dimming PWM pulse frequency can be selected through the human-machine interactive operation interface, without the need of going through the cumbersome operation of the key matrix module 5 to set the value of the frequency.

The present invention has the following advantageous effects:

The present invention provides a method for users to freely select or set the dimming PWM pulse frequency of the LED dimmable power supply according to the environmental conditions of the use. The implementation of this method enables the dimming PWM pulse frequency of the LED dimmable power supply to be freely set and changed according to the environment of the use. In occasions where the requirement for dimming noise and flicker is not high, the dimming PWM pulse frequency can be adjusted lower; in occasions where the requirements for dimming noise and flicker are high, the dimming PWM pulse frequency can be increased. The method is flexible and convenient, and it can assist users to achieve the most appropriate use and dimming effect of the LED dimmable power supply that uses this method according to the environment of the use.

The embodiments in this specification are described in an incremental manner, each embodiment focuses on the differences with the other embodiments, and the same or similar parts between the embodiments are provided for mutual reference.

While the principle and implementation method of the invention are described in some detail hereinbelow with reference to certain illustrated embodiments, it is to be understood that these embodiments are only intended for helping to understand the methodology of the present invention and its core ideas; there is no intent to limit the scope of the invention. To the contrary, it is intended to cover various modifications, alternatives and equivalents, and the scope of the appended claims therefore should be accorded the broadest interpretation so as to encompass all such modifications and similar arrangements and procedures. In summary, the contents of this document should not be construed as a limitation of the present invention.

What is claimed is:

1. A method of selecting a PWM dimming frequency for a dimmable LED power supply, applied to an LED dimmable power supply, the LED dimmable power supply comprising a power MOS tube and a main power drive, a dimming signal processing circuit, a main control module and four-shift switching module, which are sequentially coupled to one another, the power MOS tube having a gate coupled to the main control module, a source coupled to the main power drive, and a drain coupled to a negative electrode of a lamp, and the main power drive being coupled to a positive electrode of the lamp, characterized in that the method comprises the steps of:

detecting a shift element signal status of the four-shift switching module by the main control module after the main power drive is powered on;

determining a dimming PWM pulse frequency currently outputted by the power supply according to the shift element signal status based on the main control module, and collecting a signal sample of the dimming signal processing circuit to obtain a sample signal; and determining a PWM drive signal according to the dimming PWM pulse frequency and the sample signal based on the main control module, and controlling a switch status of the power MOS tube according to the PWM drive signal to adjust a lamp brightness.

2. The method according to claim 1, wherein the shift elements of the four-shift switching module comprise: 1 KHz frequency, 4 KHz frequency, 20 KHz frequency and 20 KHz frequency combined with a PWM pulse frequency conversion.

3. The method according to claim 1, further comprising the step of setting the PWM pulse frequency of the four-shift switching module by modifying a software program.

* * * * *